(12) United States Patent
Biermann et al.

(10) Patent No.: US 7,438,756 B2
(45) Date of Patent: Oct. 21, 2008

(54) METHOD OF IMPROVING MATERIAL COMPRISING A POZZOLANIC COMPONENT

(75) Inventors: Joseph Jan Peter Biermann, Apeldoorn (NL); Nicolaas Voogt, Beekbergen (NL)

(73) Assignee: Minplus B.V. (NL)

( * ) Notice: Subject to any disclaimer, the term of this patent is extended or adjusted under 35 U.S.C. 154(b) by 542 days.

(21) Appl. No.: 10/507,869

(22) PCT Filed: Mar. 19, 2003

(86) PCT No.: PCT/NL03/00208

§ 371 (c)(1),
(2), (4) Date: Sep. 16, 2004

(87) PCT Pub. No.: WO03/078348

PCT Pub. Date: Sep. 25, 2003

(65) Prior Publication Data

US 2005/0223950 A1    Oct. 13, 2005

(30) Foreign Application Priority Data

Mar. 19, 2002    (NL) .................................. 1020205

(51) Int. Cl.
*C04B 14/10* (2006.01)
(52) U.S. Cl. .................... 106/716; 106/705; 106/718; 106/DIG. 1; 423/155; 423/173

(58) Field of Classification Search ............ 106/DIG. 1, 106/705, 718, 716; 423/155, 173
See application file for complete search history.

(56) References Cited

U.S. PATENT DOCUMENTS

| 5,232,496 | A | * | 8/1993 | Jennings et al. | 106/713 |
| 5,919,424 | A | * | 7/1999 | Klyosov et al. | 423/165 |
| 5,961,941 | A | * | 10/1999 | Klyosov et al. | 423/165 |
| 6,221,148 | B1 | * | 4/2001 | Mathur et al. | 106/484 |
| 6,425,973 | B1 | * | 7/2002 | Phipps | 162/4 |
| 6,533,848 | B1 | * | 3/2003 | Robl et al. | 209/166 |
| 7,300,539 | B2 | * | 11/2007 | Phipps | 162/4 |
| 2004/0055519 | A1 | * | 3/2004 | Craido et al. | 110/342 |

FOREIGN PATENT DOCUMENTS

| CN | 1 194 951 A1 | 10/1998 |
| GB | 2 294 259 A | 4/1996 |
| WO | WO 96/06057 A1 | 2/1996 |
| WO | WO 98/57905 A1 | 12/1998 |
| WO | WO 00/61515 A1 | 10/2000 |

* cited by examiner

*Primary Examiner*—Paul Marcantoni
(74) *Attorney, Agent, or Firm*—Akerman Senterfitt

(57) ABSTRACT

The invention relates to a method of improving a material comprising a pozzolanic component. According to the invention the material is treated with an aqueous liquid resulting in treated, calcium-depleted material and a calcium-enriched aqueous solution, which are subsequently separated. This provides a material having an increased pozzolanity and/or increased specific surface area.

16 Claims, No Drawings

METHOD OF IMPROVING MATERIAL COMPRISING A POZZOLANIC COMPONENT

The present invention relates to a method of improving a material comprising a pozzolanic component.

Materials containing a pozzolanic component are used as constituent of compositions for the manufacture of concrete or cement. Their pozzolanic effect allows them to bind (calcium) hydroxide. Curing of concrete or cement causes the release of hydroxides. Their presence is undesirable as the uptake of carbon dioxide or sulphur dioxide, for example from the air, causes the formation of a carbonate or sulphate, which is accompanied by an increase in volume, adversely affecting the strength and porosity of the product in use. Moreover, the hydroxides, carbonates and sulphates may cause efflorescence from the constructional product, resulting in discoloration and staining. By binding the hydroxides by means of materials having pozzolanic properties, the hydroxides exposed to air are no longer able to form carbonates or sulphates, which increases the durability of the constructional product. Materials having a pozzolanic component therefore should have the highest possible absorption capacity for hydroxides. The treatment of artificial pozzolanic material being produced during thermal treatment of paper residues immediately thereafter with a limited amount of water, in particular in the form of steam or carbon dioxide, is known. It converts the calcium oxide formed during the thermal treatment to calcium hydroxide or calcium carbonate. Calcium hydroxide is detrimental to the calcium hydroxide binding capacity of the pozzolanic material. Allowing the calcium hydroxide to take up carbon dioxide for the formation of calcium carbonate is well-known. Calcium in concrete or cement in the form of calcium carbonate is less harmful for the properties of the concrete or the cement than calcium oxide or calcium hydroxide. However, since it does not significantly contribute to the favourable properties of the concrete or the cement, it is superfluous or undesirable.

It is the object of the present invention to provide a method of improving a material comprising a pozzolanic component, wherein the pozzolanic nature of the material is enhanced.

To this end, the method according to the present invention is characterized in that: the material comprises at least 2% by weight of a calcium compound selected from calcium oxide, calcium hydroxide and calcium carbonate, and the material comprising a pozzolanic component is treated with an aqueous liquid with a pH=x, with x being <12.5, resulting in treated, calcium-depleted material and a calcium-enriched aqueous solution;

the treatment is continued until the pH of the calcium-enriched aqueous solution is at least x+0.2; and the treated calcium-depleted material and the calcium-enriched aqueous solution are separated.

By improving the material as mentioned above, the content of calcium compounds is reduced. Surprisingly it was shown that with the aid of the method according to the present invention, the pozzolanic effect of residual material comprising a limited amount of pozzolanic component, such as paper ash containing approximately 30% metakaolin, can be improved, even up to values never previously attained, even surpassing natural pozzolanic materials. The calcium-depleted material obtained by the method may be dried. Surprisingly however, the material according to the invention can also be stored wet or even as slurry. This does not diminish the pozzolanic effect. The advantages thus achieved are considerable, with the omission of an extra step for the removal of water obviously leading to a considerable saving in costs.

Furthermore, the material comprising a pozzolanic component does not need to be protected from moisture for fear of it becoming hard. This is a considerable saving on packaging costs and storage costs. In addition, the material can be pumped and simply be mixed with other constituents such as strength-improving silicafume, for the production of cement or concrete. As aqueous liquid water may be used, but it is preferred to use an aqueous acidic solution and optionally a solution comprising a chelating compound. Such a solution may comprise, for example, EDTA or citric acid. Preferably x is <11 and the pH is increased by at least 0.5. It is believed, that the method according to the invention also allows natural pozzolanic materials to be improved with respect to their pozzolanic effect. In general, the treatment according to the invention will be performed until a material is obtained having a pozzolanity of at least 20%, more preferably at least 30% en most preferably at least 40% above the pozzolanity of the starting material.

According to a first embodiment, the material comprising a pozzolanic component is suspended in the aqueous liquid, and after a desirable contacting time the treated material is separated from the calcium-enriched solution.

According to an alternative embodiment, the aqueous liquid is passed through a bed of material comprising the pozzolanic component.

This is an effective manner of bringing the material in contact with the aqueous liquid and of reducing the calcium content.

The treatment is preferably continued until the pH of the calcium-enriched aqueous solution is between 5 and 10.

Such a pH greatly enhances the pozzolanic effect.

According to an alternative embodiment, the treatment is continued until the pH of the calcium-enriched aqueous solution lies between 1 and 5.

This provides a material comprising a pozzolanic component with a greatly enlarged surface area.

According to a second alternative embodiment, the treatment is continued until the pH of the calcium-enriched aqueous solution is lower than 1.

In this way aluminium and silica are removed in addition to calcium, resulting in a product with an exceptionally high specific surface area.

According to an important application the material comprising a pozzolanic component is obtained by thermal treatment of a paper-comprising residual material.

In the paper production and the processing of waste paper, paper residues are produced that have to be disposed of at high cost. Thermal treatment of the paper residues not only reduces the volume but also produces a material comprising a pozzolanic component, depending on the process conditions in a useful concentration. With the aid of the method according to the invention the value of this residue can be increased further.

The material is preferably obtained by using as the residual material a paper residue, and thermally treating it in a fluidised bed installation, wherein the fluidised bed is operated at a temperature below 850° C., and wherein a freeboard present above the fluidised bed is also maintained at a temperature below 850° C.

The examples show the vast improvement of the pozzolanic effect of the material obtained by this method. A detailed description of the method of obtaining the material by means of the thus operated fluidised bed can be found in PCT/NL95/00280.

According to a favourable embodiment, the treatment is carried out with the aid of a waste-acid-comprising liquid as aqueous liquid.

In this way, an acid that would otherwise have to be disposed of at higher cost can be used for improving the material to produce an economically more attractive product.

The method according to the invention also allows for the recovery of calcium from the calcium-enriched solution. This may then be marketed for example, for constructional applications (such as sandlime brick) or as pigment, for example, for the paper industry.

Preferably a $CO_2$-comprising gas is conducted through the calcium-enriched aqueous solution and the formed calcium carbonate is separated.

If desired, for example in case the calcium-enriched aqueous solution is acidic, alkali may be added, for example waste-lye, to facilitate precipitation of $CaCO_3$ by $CO_2$.

Advantageously, the $CO_2$-comprising gas comes from a thermal treatment of the residue that produces the material with a pozzolanic component.

In this manner the waste gas produced can be used profitably and cheaply.

Finally, the invention relates to a method of preparing cement or concrete, characterised in that improved material prepared according to the invention is added to the usual starting material for cement or concrete, that is starting material comprising a) at least one material chosen from the group of ground blast furnace slag and Portland cement, b) sand, and c) water, or that part of the starting material is replaced by the pozzolanic material.

This allows for the preparation of cement or concrete having an improved performance compared to cement or concrete prepared using untreated material.

According to a preferred embodiment, the improved material is added as an aqueous slurry.

This gives the advantages mentioned above, amongst which ease of use and prevention of dust.

The invention will now be further elucidated with reference to the following exemplary embodiments.

In the Examples 1 to 4 the starting material is a pozzolanic material obtained by thermal treatment of paper sludge, as described in PCT/NL95/00280, hereafter indicated as CDEM-ash 1. The composition of CDEM-ash 1 is given in the Table 1 below. A portion of this material was heated in air in an electric furnace at 1050° C. for 12 hours. This provides a material, hereafter indicated as CDEM-ash 2, having a low pozzolanic activity that is comparable with the ash obtained by incinerating paper sludge (de-inking residue) at temperatures >850° C. The composition of this is also given in Table 1.

TABLE 1

| Composition of starting materials in percent by weight. | | |
|---|---|---|
| Component | CDEM-ash 1 | CDEM-ash 2 |
| $CaCO_3 + CaO + Ca(OH)_2$ | <70.8 | 66 (partly together with alumina-silicates) |
| Metakaolin | 27.6 | 0 |
| Inert | 6.6 | 6.6 |
| Alumina-silicates | <5 | 30 |

EXAMPLE 1

1850 ml de-mineralised water were added to 10 g of CDEM-ash 1 and CDEM-ash 2, respectively, and stirred for 30 minutes. Subsequently, the solid was filtered off with the aid of a Büchner-funnel and the remaining solid was washed with 2×100 ml of de-mineralised water. The pH of the thus obtained filtrate was measured. The solid obtained was dried for a minimum of 4 hours at 100° C. The pH of the filtrate was 12.

EXAMPLE 2

Example 1 was repeated, except that instead of 1850 ml de-mineralised water 1500 ml aqueous hydrochloric acid at pH 4 was used for 15 g of the respective ash. The pH of the filtrate was 7.

EXAMPLE 3

Example 1 was repeated, except that instead of 1850 ml de-mineralised water 600 ml 2 M acetic acid was used for 30 g of the respective ash. The pH of the filtrate was 4.

EXAMPLE 4

Example 1 was repeated, except that instead of 1850 ml de-mineralised water 1000 ml 2 N hydrochloric acid was used for 50 g of the respective ash. The pH of the filtrate was 0.5.

EXAMPLE 5

The materials obtained according to the Examples 1-4 were characterized with regard to their specific surface, mineral composition and pozzolanic nature. The chemical composition of the filtrate was also examined.

The specific surface is determined by the BET-method (Brunauer et al. JACS 60, (1938), using the adsorption isotherm of nitrogen on a surface.

The mineral composition is determined by X-ray diffraction (XRD); Warren, B. E., X-ray diffraction. Dover Pub.; ISBN 04866631745). The peak heights of the various calcium components were added up after which the heights of the peaks of the respective components were arithmetically divided by the total peak height obtained by summation as an indication for the concentrations of the various calcium components. The XRD-peak maxima for calcium hydroxide, calcium oxide and calcium carbonate, respectively, were 18.15±0.05, 37.35±0.05 and 29.4±0.01 (2 theta values).

To determine the pozzolanity, equal amounts of calcium hydroxide and material obtained according to the examples were mixed, and per gram of the thus obtained mixture 1.25 grams of water were added. The thus obtained pastes were stored for 5 days at room temperature to allow the pozzolanic reaction between calcium hydroxide and the material to take place. After 5 days the pastes were at least in part set due to the reactions that had taken place. The set pastes were ground into particles with a diameter of less than 100 µm. Subsequently, the ground pastes were characterized with the aid of differential thermal analysis, (DTA; Brown, M. E., Introduction to Thermal Analysis, Kluwer Academic Publishers; ISBN 0412302306, and Hatakeyama, T. et al., Handbook of Thermal Analysis, John Wiley & Son Ltd.; ISBN 0471983632), to determine the surface (A1) of the calcium hydroxide peak. Pure silicon oxide has no pozzolanic activity and was used as standard. The surface of the calcium hydroxide peak was determined for silicon oxide and takes the value A0. The pozzolanity can be calculated using the following formula:

$$\text{Pozzolanity} = (A0 - A1)/A0$$

The chemical elements in the filtrate were determined with the aid of atomic absorption spectroscopy (AAS; Ebdon, L. et al., An Introduction to Analytical Atomic Spectrometry, John Wiley & Son Ltd.; ISBN 041974188).

The results of the measurements described above relate to CDEM-ash 1 and CDEM-ash 2 in Tables 2 and 3, respectively.

TABLE 2

Results CDEM-ash 1

| Treatment | BET ($m^2$/gram) | Washed out (% by weight) | | | XRD (relative intensities) | | | Pozzolanity (%) |
|---|---|---|---|---|---|---|---|---|
| | | Ca | Al | Si | Ca(OH)$_2$ | CaO | CaCO$_3$ | |
| Untreated | 13.2 | 0 | 0 | 0 | 0 | 29 | 71 | 43 |
| Example 1 | 37.4 | 3 | 0.1 | 0 | 0 | 6 | 87 | 46 |
| Example 2 | 54.4 | 19 | 0 | 0 | 0 | 0 | 88 | 90 |
| Example 3 | 26.5 | 38 | 4 | 1 | 0 | 0 | 0 | 77 |
| Example 4 | 69.5 | 31 | 4 | 4 | 0 | 0 | 0 | 83 |

TABLE 3

Results CDEM-ash 2

| Treatment | BET ($m^2$/gram) | Washed out (% by weight) | | | XRD (relative intensities) | | | Pozzolanity (%) |
|---|---|---|---|---|---|---|---|---|
| | | Ca | Al | Si | Ca(OH)$_2$ | CaO | CaCO$_3$ | |
| Untreated | 6.7 | 0 | 0 | 0 | 18 | 40 | 8 | 10 |
| Example 1 | 16.8 | 2 | 0.7 | 0 | not determined with certainty | 6 | 0 | 3 |
| Example 2 | 63.9 | 25 | 0 | 0 | not determined with certainty | 16 | 14 | 63 |
| Example 3 | 37.8 | 35 | 3 | 1 | 0 | 0 | 0 | 69 |
| Example 4 | 154.8 | 42 | 9 | 6 | 0 | 0 | 0 | 79 |

As can be seen from the above Tables 2 and 3, only a few percent are washed out of the material obtained according to Example 1. However, the specific surface is increased considerably.

The materials obtained in accordance with the Examples 2-4, show a strong increase of the pozzolanic effect. As comparison, commercially obtainable pozzolanes comprised of pure metakaolin show values between 70 and 75% using the test method described above. The specific surface also increases. Despite the fact that CDEM-ash 2 does not contain much metakaolin in comparison to CDEM-ash 1 (CDEM-ash comprises approximately 30% metakaolin), it is remarkable that for CDEM-ash 2 it is still possible to achieve a pozzolanity of more than 63%.

With regard to the materials according to Examples 3 and 4, aluminium and silicon are also washed out. In spite of that, the pozzolanity is high.

As will be obvious to the ordinary person skilled in the art, the method according to the invention can be applied in various manners that are within the scope of the appended claims. For example, it is possible to use a continuous phase separation process as known in the art.

The invention claimed is:

1. A method of improving a material comprising a pozzolanic kaolin component, and at least 2% by weight of a calcium compound selected from the group consisting of calcium oxide, calcium hydroxide and calcium carbonate, and
   the material is treated with an aqueous liquid with a pH=x, with x being <12.5, resulting in treated, calcium-depleted material that, as a result of the treatment, contains modified-kaolin of improved pozzolanity and a calcium-enriched aqueous solution;
   characterized in that the treatment is continued until the pH of the calcium-enriched aqueous solution is at least x+0.2; and
   the treated calcium-depleted modified-kaolin containing material and the calcium-enriched aqueous solution are separated.

2. A method according to claim 1, characterised in that the material comprising a pozzolanic component is suspended in the aqueous liquid, and after a contacting time the treated material is separated from the calcium-enriched solution.

3. A method according to claim 1, characterised in that the aqueous liquid is conducted through a bed of material comprising the pozzolanic component.

4. A method according to claim 1, characterised in that the treatment is continued until the pH of the calcium-enriched aqueous solution is between 5 and 10.

5. A method according to claim 1, characterised in that the treatment is continued until the pH of the calcium-enriched aqueous solution is between 1 and 5.

6. A method according to claim 1, characterised in that the treatment is continued until the pH of the calcium-enriched aqueous solution is lower than 1.

7. A method according to claim 1, characterised in that the material comprising a pozzolanic component is obtained by thermal treatment of a paper-comprising residual material.

8. A method according to claim 7, characterised in that the material is obtained by using as the residual material a paper residue, and thermally treating it in a fluidised bed installation, wherein the fluidised bed is operated at a temperature below 850° C., and wherein a freeboard present above the fluidised bed is also maintained at a temperature below 850° C.

9. A method according to claim 1, characterised in that the treatment is carried out with the aid of a waste-acid comprising liquid as aqueous liquid.

10. A method according to claim 1, characterised in that calcium is recovered from the calcium-enriched solution.

11. A method according to claim 10, characterised in that a $CO_2$-comprising gas is passed through the calcium-enriched aqueous solution and the formed calcium carbonate is separated.

12. A method according to claim 11, characterised in that the $CO_2$-comprising gas comes from a thermal treatment of the residue.

13. A method of preparing cement or concrete, characterised in that improved material prepared according to claim 1 is added to the usual starting material for cement or concrete, that is starting material comprising a) at least one material selected from the group consisting of ground blast furnace slag and Portland cement, b) sand, and c) water, or that part of the starting is replaced by the pozzolanic material.

14. A method according to claim 13, characterised in that the improved material is added as an aqueous slurry.

15. The method according to claim 1, characterized in that the material comprising a pozzolanic kaolin component is obtained from the conversion of a starting material that is obtained from paper recycling or paper producing processes; and that the starting material is thermally converted using a fluidized bed process.

16. A method of improving a material comprising a pozzolanic kaolin component and at least 2% by weight of a calcium compound selected from the group consisting of calcium oxide, calcium hydroxide and calcium carbonate, and the material is treated with an aqueous liquid with a pH=x, with x being <12.5, resulting in treated, calcium-depleted material that, as a result of the treatment, contains modified-kaolin of improved pozzolanity and a calcium-enriched aqueous solution;

the material comprising a pozzolanic kaolin component is obtained from the conversion of a starting material that is obtained from paper recycling or paper producing processes;

the starting material being thermally converted using a fluidized bed process; and the treatment being continued until the pH of the calcium-enriched aqueous solution is at least x+0.2; and the treated calcium-depleted modified-kaolin containing material and the calcium-enriched aqueous solution are separated.

\* \* \* \* \*